United States Patent
Lo et al.

(10) Patent No.: US 9,851,442 B1
(45) Date of Patent: Dec. 26, 2017

(54) LADAR AUGMENTED INFRA-RED (LAIR) SENSOR

(71) Applicant: THE BOEING COMPANY, Chicago, IL (US)

(72) Inventors: Mark Lo, Clayton, MO (US); Joel E. Anspach, Corrales, NM (US); Michael C. Cates, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 1344 days.

(21) Appl. No.: 14/072,489

(22) Filed: Nov. 5, 2013

(51) Int. Cl.
*G01C 3/08* (2006.01)
*G01S 17/08* (2006.01)

(52) U.S. Cl.
CPC .................................. *G01S 17/08* (2013.01)

(58) Field of Classification Search
CPC ....................................................... G01S 17/08
See application file for complete search history.

(56) References Cited

U.S. PATENT DOCUMENTS

| | | | | |
|---|---|---|---|---|
| 3,644,043 | A | * | 2/1972 | Jones ...................... F41G 3/065 250/203.1 |
| 2006/0022115 | A1 | * | 2/2006 | Byren ..................... G02B 26/06 250/201.9 |
| 2012/0044476 | A1 | * | 2/2012 | Earhart ................. G01S 3/7867 356/4.01 |

* cited by examiner

Primary Examiner — Samantha K Abraham
(74) Attorney, Agent, or Firm — Haynes and Boone, LLP

(57) ABSTRACT

A system, method, and apparatus for detecting and tracking a target are disclosed. The disclosed method involves receiving, with an infra-red (IR) fine track sensor, a IR signal from the target. The method further involves determining, with at least one processor, an estimate of a direction of the target using the IR signal. Also, the method involves transmitting, with a Laser transmitter, a Laser beam towards the direction of the target. Further, the method involves receiving, with a Laser receiver, the Laser signal after it reflects off the target. In one or more embodiments, the Laser receiver is a photon receiver (e.g., a geiger-mode avalanche photo-diode (Gm-APD) receiver).

20 Claims, 7 Drawing Sheets

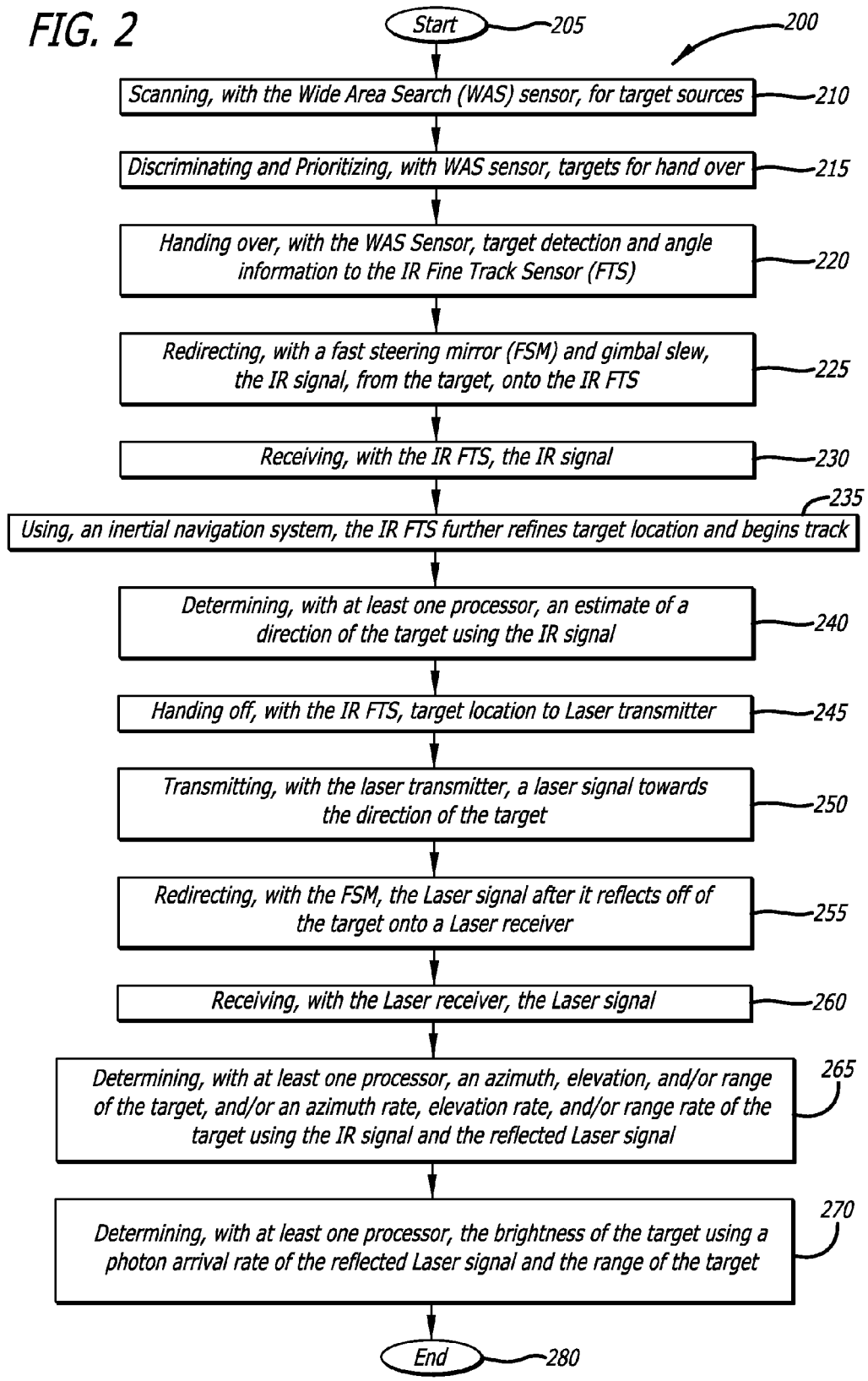

LADAR AUGMENTED INFRA-RED (LAIR) SENSOR

FIELD

The present disclosure relates to infra-red (IR) sensor. In particular, it relates to Laser detection and ranging (LADAR) augmented infra-red (LAIR) sensors.

BACKGROUND

Currently, stand alone passive, infra-red search and track (IRST) systems are used for infrared tracking of a target. Passive IR sensing by itself does not provide a complete picture of the battlespace. An IRST sensor does not obtain accurate range and range rates without special maneuvers by a single aircraft or multi-lateration by two or more aircraft. In addition, targets at long range are unresolved providing little information for characterization. Also, clutter and other phenomenology present tracking challenges. Finally, to detect at long ranges, an IRST must relax False Alarm (FA) thresholds without a highly responsive means of target/FA verification.

It should be noted that modern wide-area IR sensing systems go through a temporal processing sequence to isolate FA sources, such as clutter, in order to build its watch, track, and declare lists. This does not mean that false alarms do not reach the latter two lists. At this point, a modern IRST system that has a single-target-track (STT) mode could switch into this mode to confirm that a suspicious declared target is, indeed, real. This, however, means that the operator must notice something is "not quite right" with a declared track, decide to switch the mode to STT, wait for the scan of the volume to perform target/FA scans, and switch back to track-while-scan (TWS) surveillance. Meanwhile, this commanded mode switch has pulled the IR sensing system away from providing wide-area TWS situational awareness for the duration. As such, there is a need for improved infra-red sensing abilities.

SUMMARY

The present disclosure relates to a method, system, and apparatus for a Laser detection and ranging (LADAR) augmented infra-red (LAIR) sensor. In one or more embodiments, a method for detecting and tracking a target involves receiving, with an infra-red (IR) fine track sensor, an IR signal from the target. The method further involves determining, with at least one processor, an estimate of a direction of the target using the IR signal. Also, the method involves transmitting, with a Laser transmitter, a Laser beam towards the direction of the target. Further, the method involves receiving, with a Laser receiver, the Laser beam after it reflects off the target.

In one or more embodiments, the method further involves determining, with at least one processor, an azimuth, elevation, and/or range of the target and/or an azimuth rate, elevation rate, and/or range rate of the target using the IR signal and the reflected Laser signal. In some embodiments, the method further involves determining, with at least one processor, a brightness of the target using a photon arrival rate of the reflected Laser signal and the range of the target.

In at least one embodiment, the IR fine track sensor, the Laser transmitter, and the Laser receiver are mounted together on a gimbal. In one or more embodiments, the method further involves tracking, by using an inertial navigation system and the gimbal, the target using the IR signal.

In some embodiments, the method further involves positioning, with the gimbal, the IR fine track sensor until it receives the IR signal from the target.

In one or more embodiments, the method further involves stabilizing, with a fast steering mirror (FSM), the reflected Laser signal onto the Laser receiver. In at least one embodiment, the method further involves stabilizing, with a fast steering mirror (FSM), the IR signal onto the IR fine track sensor. In some embodiments, the Laser receiver is a photon receiver (e.g., a photon receiver comprising p-n photodiodes, p-i-n photodiodes, or avalanche photodiodes, such as a geiger-mode avalanche photo-diode (Gm-APD) receiver).

In at least one embodiment, a system for detecting and tracking a target involves an infra-red (IR) fine track sensor to receive a IR signal from the target. The system further involves at least one processor to determine an estimate of a direction of the target using the IR signal. Also, the system involves a Laser transmitter to transmit a Laser beam towards the direction of the target. Further, the system involves a Laser receiver to receive the Laser signal after it reflects off the target.

In one or more embodiments, at least one processor is further to determine an azimuth, elevation, and/or range of the target and/or an azimuth rate, elevation rate, and/or range rate of the target using the IR signal and the reflected Laser signal. In some embodiments, at least one processor is further to determine a brightness of the target using a photon arrival rate of the reflected Laser signal and the range of the target.

In at least one embodiment, the system further comprises a gimbal, where the IR fine track sensor, the Laser transmitter, and the Laser receiver are mounted together on the gimbal. In one or more embodiments, the system further comprises an inertial navigation system, where the inertial navigation system and the gimbal are used to track the target using the IR signal. In some embodiments, the gimbal is used to position the IR fine track sensor until it receives the IR signal from the target.

In one or more embodiments, the system further comprises a fast steering mirror (FSM) to stabilize the reflected Laser signal onto the Laser receiver. In at least one embodiment, the system further comprises a FSM to stabilize the IR signal onto the IR fine track sensor. In some embodiments, the IR signal has a wavelength of approximately 8 to 12 micrometers (μm). In one or more embodiments, the Laser signal has a wavelength of approximately 0.5 to 2.2 μm.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIGS. 1A, 1B, and 1C provide schematic diagrams of the disclosed system for a Laser detection and ranging (LADAR) augmented infra-red (LAIR) sensor, in accordance with at least one embodiment of the present disclosure.

FIG. 2 is a flow chart for the disclosed method for the operation of the system for a Laser detection and ranging (LADAR) augmented infra-red (LAIR) sensor of FIG. 1C, in accordance with at least one embodiment of the present disclosure.

Figure 1A:
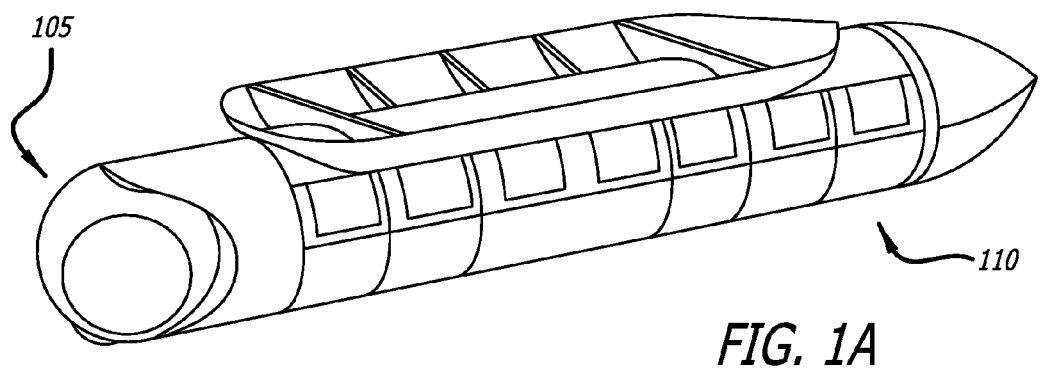
Figure 1B:
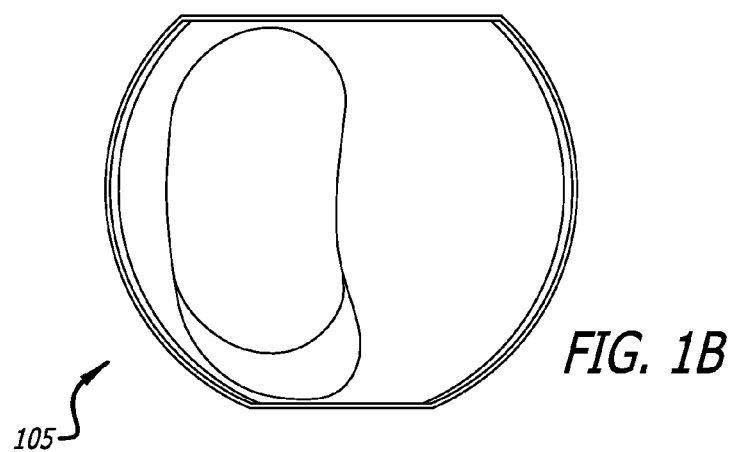
Figure 1C:
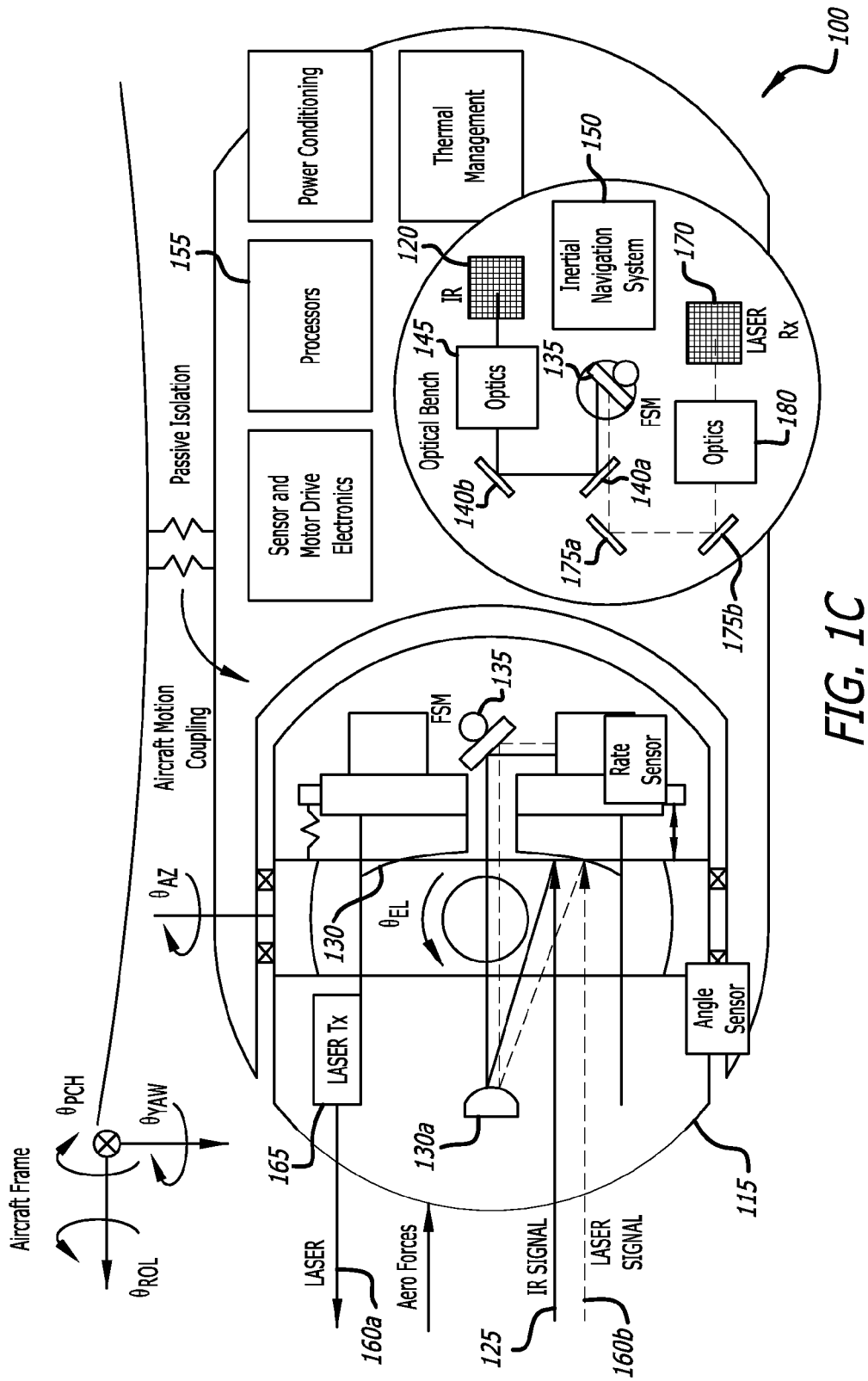

augmented infra-red (LAIR) sensor of FIG. 1C, in accordance with at least one embodiment of the present disclosure.

Figure 4A:
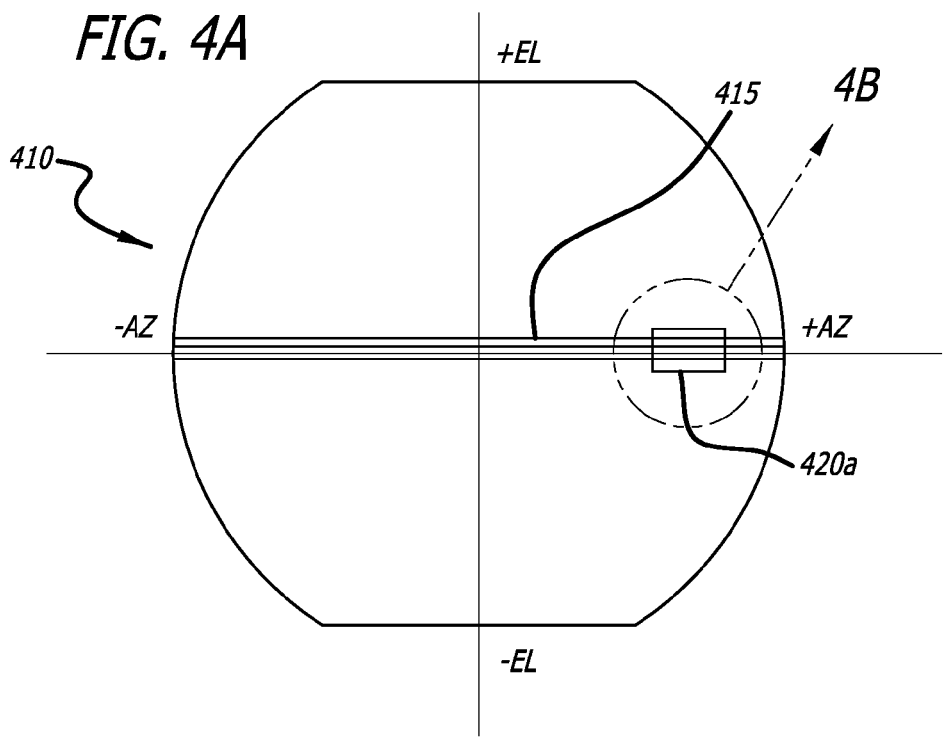
Figure 4B:
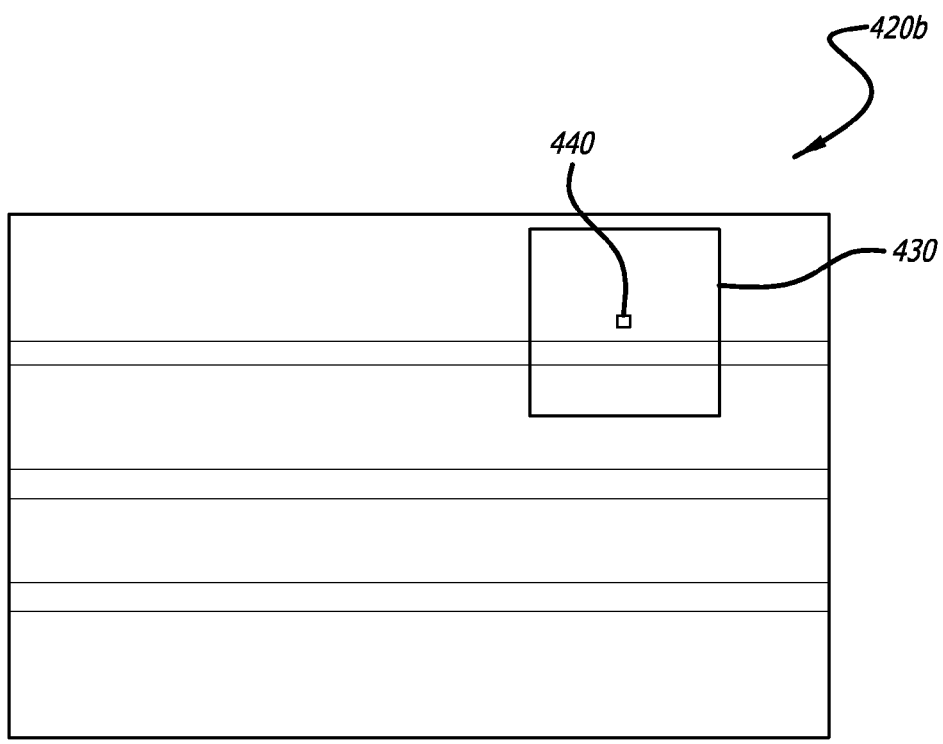

FIGS. 4A and 4B show the cascading field of views (FOVs) for a stand alone infra-red search and track (IRST) system.

Figure 5A:
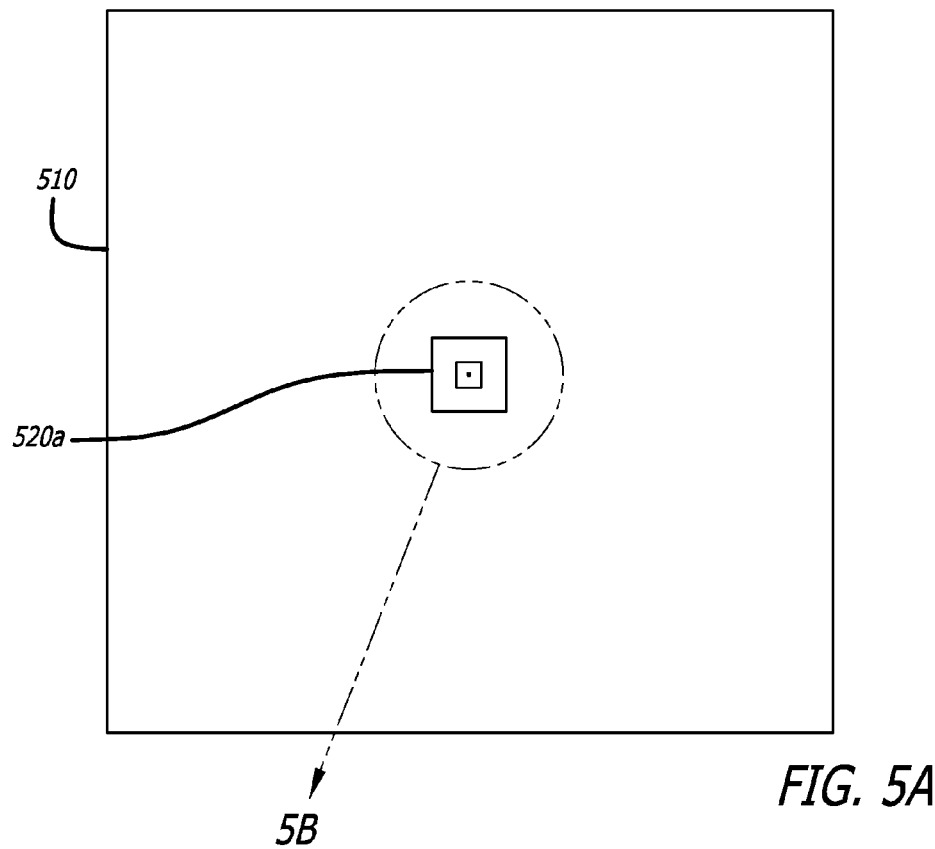
Figure 5B:
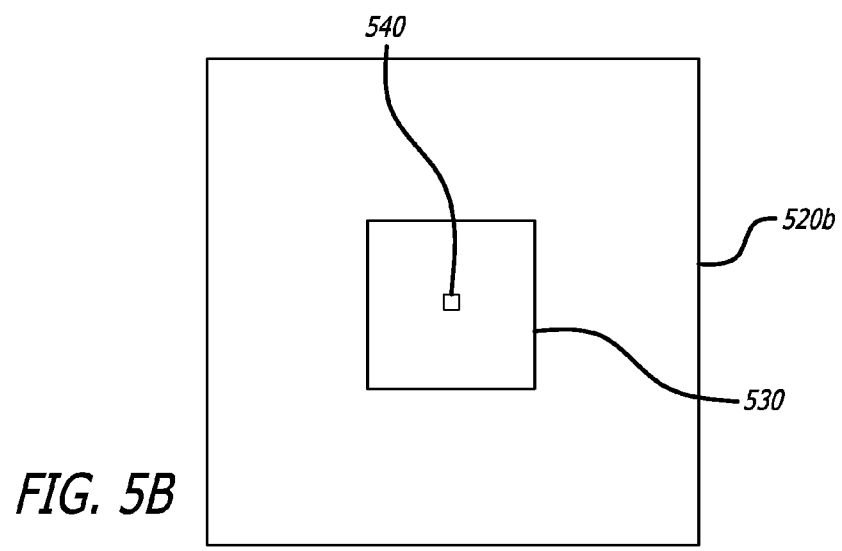

FIGS. 5A and 5B show the cascading FOVs for the disclosed system for a Laser detection and ranging (LADAR) augmented infra-red (LAIR) sensor of FIG. 1C, in accordance with at least one embodiment of the present disclosure.

Figure 6:
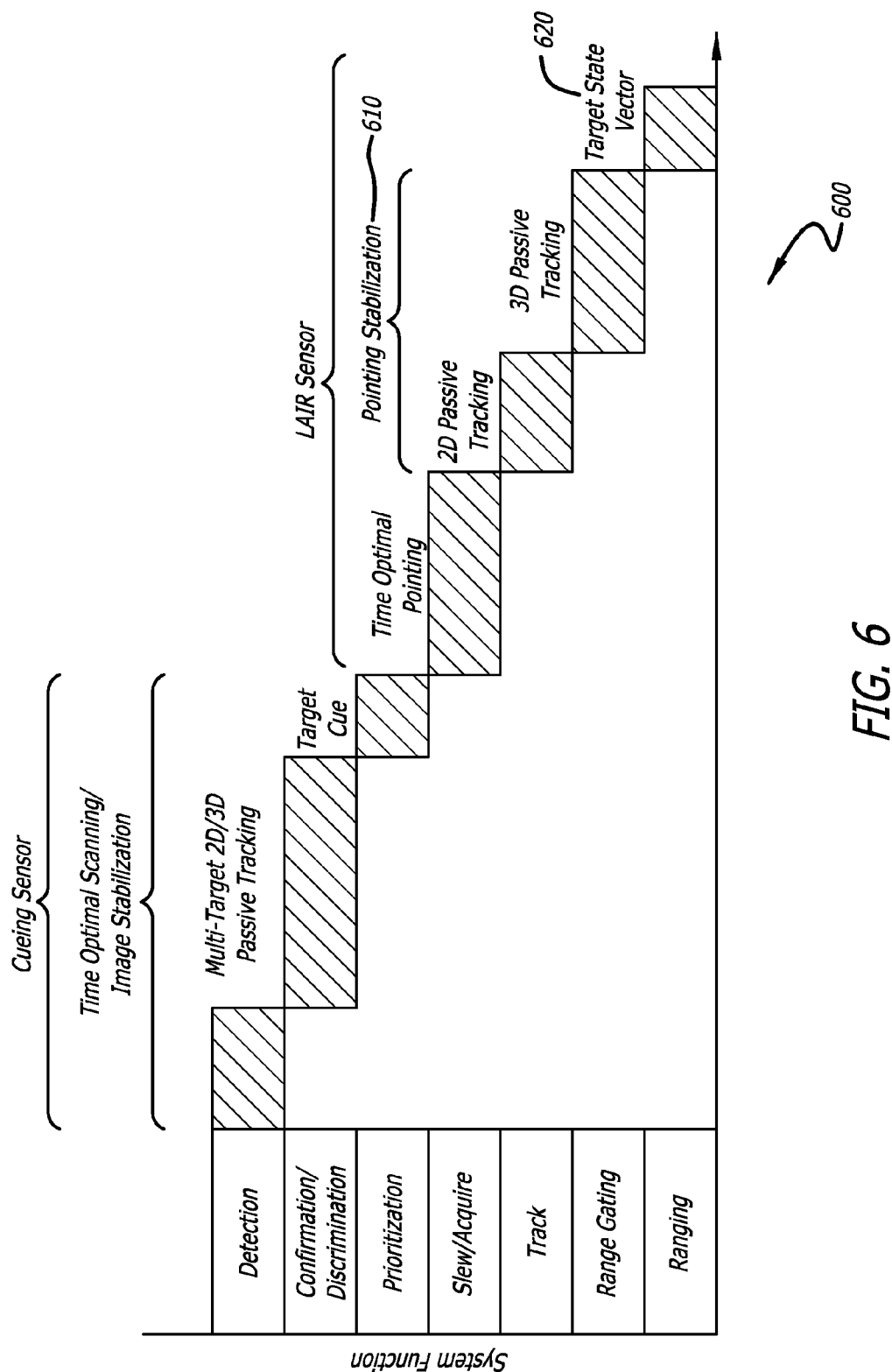

FIG. 6 is a graph showing the acquisition, tracking, and pointing timeline for the disclosed system for a Laser detection and ranging (LADAR) augmented infra-red (LAIR) sensor of FIG. 1C, in accordance with at least one embodiment of the present disclosure.

DESCRIPTION

The methods and apparatus disclosed herein provide an operative system for a Laser detection and ranging (LADAR) augmented infra-red (LAIR) sensor. In particular, the disclosed system provides a LAIR sensor, which is an integrated photonics system suite consisting of an infra-red (IR) fine track sensor, a Laser transmitter, and a Laser receiver that are all mounted onto a single gimbal. The disclosed LAIR sensor provides a user the ability to obtain range and targeting information of long-range airborne and surface targets. In particular, the LAIR sensor provides very accurate six degree-of-freedom (6DOF) state vectors for each target providing weapons quality track (WQT) information. The LAIR also provides a highly resolved range profile not limited by angular resolution, and provides information for target characterization.

As previously mentioned above, stand alone infra-red search and track (IRST) systems are currently used for infrared tracking of a target. The IRST systems are able to locate a light (i.e. a target) presence by giving an azimuth and elevation offset, but do not have the capability to provide any additional information about the light, such as bearing, range, altitude, orientation and other source information. As such, the IRST systems only provide a coarse location of the target.

The disclosed LAIR sensor enables superior infra-red tracking capabilities by uniquely combining standard IRST hardware with additional sensor hardware elements. The unique combination of the standard IRST system with a LADAR transmitter and a photon-counting LADAR receiver provides, as described by the present disclosure, improved sensing abilities, including the ability to determine the source and the direction of the light (i.e. the target). The augmentation of the Laser on the LAIR sensor provides a superior method for measuring target location versus a passive only IRST. The Laser receiver provides photon counting capability, which the IRST cannot perform.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIGS. 1A, 1B, and 1C provide schematic diagrams of the disclosed system 100 for a Laser detection and ranging (LADAR) augmented infra-red (LAIR) sensor, in accordance with at least one embodiment of the present disclosure. In one or more embodiments, referring to FIGS. 1A and 1B, the disclosed system 100 may be at least partially housed within a portion 105 of a sensor pod 110, which may be mounted to the underside of an aircraft (not shown).

Referring to FIG. 1C, an infra-red (IR) signal 125 propagates from a target (not shown). The system 100 (which includes an IR fine track sensor 120, a Laser transmitter 165, and a Laser receiver 170) is mounted on a gimbal 115. A gimbal 115 gimbals (i.e. positions) the system 100, which includes an IR fine track sensor 120, until the IR fine track sensor 120 receives the IR signal 125 from the target.

The IR signal 125 is shown to propagate into the system 100, and reflect off a primary mirror 130 and secondary mirror 130a. The IR signal 125 then reflects off a fast steering mirror (FSM) 135. The FSM 135 stabilizes the IR signal 125 onto the IR fine track sensor 120 via a couple of mirrors 140a, 140b and optics 145 (e.g., at least one lens). As such, the IR fine track sensor 120 then receives the IR signal 125.

An inertial navigation system 150 and the gimbal 115 use the IR signal to gimbal (i.e. position) the system 100 accordingly to track the target. At least one processor 155 determines an estimate of the direction of the target by using the IR signal 125.

A Laser transmitter 165 transmits a Laser signal 160a towards the direction of the target. The Laser signal 160a reflects off the target and back towards the system 100. The reflected laser signal 160b is shown to propagate into the system 100, and reflect off the primary mirror 130 and the secondary mirror 130a. The reflected Laser signal 160b then reflects off the FSM 135. The FSM 135 stabilizes the reflected Laser signal 160b onto a Laser receiver 170 (e.g., a LADAR receiver, such as a photon receiver (e.g., a photon receiver comprising p-n photodiodes, p-i-n photodiodes, or avalanche photodiodes, such as a geiger-mode avalanche photo-diode (Gm-APD) receiver)), via a couple of mirrors 175a, 175b and optics 180 (e.g., at least one lens). Thus, the Laser receiver 170 then receives the reflected Laser signal 160b.

At least one processor 155 uses the IR signal 125 and the reflected Laser signal 160b to determine the azimuth, elevation, and range of the target as well as the azimuth rate, elevation rate, and range rate of the target. In addition, at least one processor 155 uses the photon arrival rate of the reflected Laser signal 160b and the range of the target to determine the brightness of the target.

FIG. 2 is a flow chart for the disclosed method 200 for the operation of the system 100 for a Laser detection and ranging (LADAR) augmented infra-red (LAIR) sensor of FIG. 1C, in accordance with at least one embodiment of the present disclosure. At the start 205 of the method 200, a Wide Area Search (WAS) sensor scans for target sources 210. Then, the WAS sensor discriminates and prioritizes targets for a hand over 215. The WAS sensor then hands over the target detection and angle information to an IR fine track sensor (FTS) 220.

Then, a fast steering mirror (FSM) and gimbal slew redirects the IR signal from the target onto the IR FTS 225. The IR FTS then receives the IR signal 230. The IR FTS uses an inertial navigation system to further refine the target location and begins tracking 235. At least one processor determines an estimate of a direction of the target using the IR signal 240.

The IR FTS hands off the target location to a laser transmitter 245. The Laser transmitter then transmits a Laser signal towards the direction of the target 250. Then, the FSM redirects the Laser signal after it reflects off of the target onto the Laser receiver 255. The Laser receiver receives the Laser signal 260. Then, at least one processor determines an azimuth, elevation, and/or range of the target, and/or an azimuth rate, elevation rate, and/or range rate of the target using the IR signal and the reflected Laser signal 265. At least one processor determines the brightness of the target using a photon arrival rate of the reflected signal and the range of the target 270. Then, the method 200 ends 280.

Figure 3:
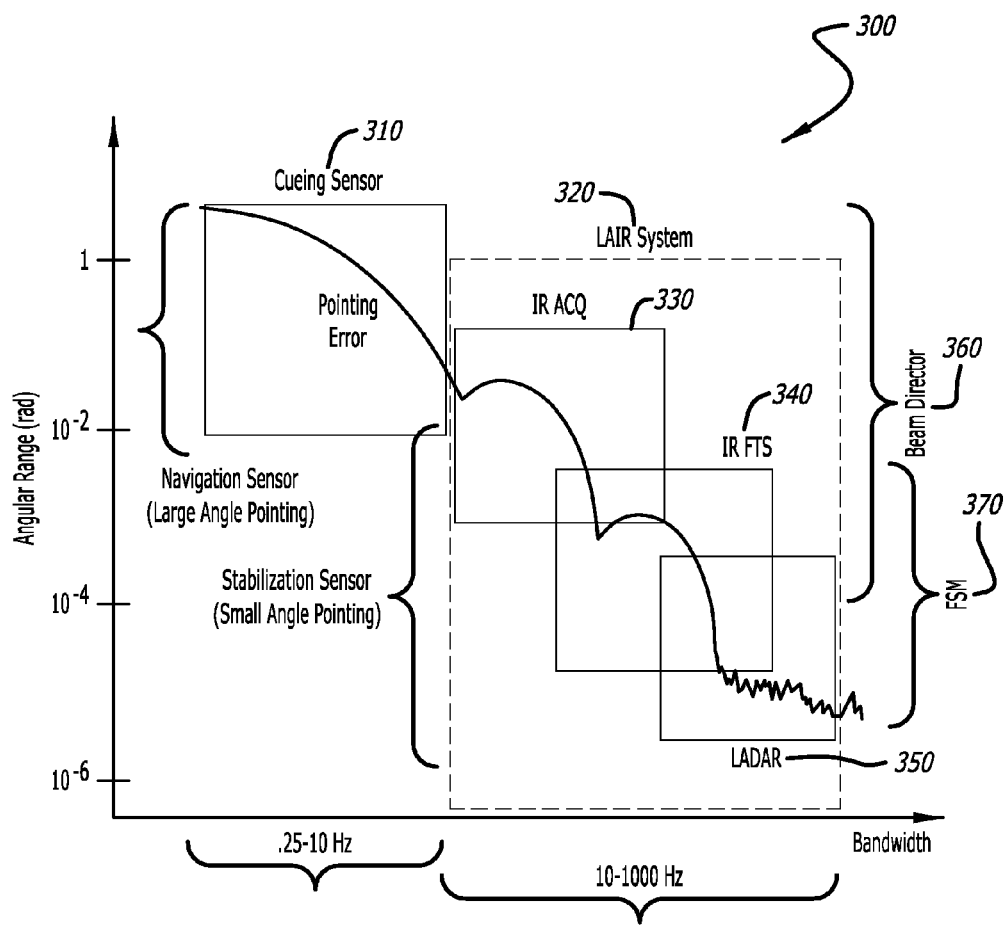
FIG. 3 is a graph showing the tracking dynamic range for the system for a Laser detection and ranging (LADAR)

FIG. 3 is a graph 300 showing the tracking dynamic range for the system 100 for a Laser detection and ranging (LADAR) augmented infra-red (LAIR) sensor of FIG. 1C, in accordance with at least one embodiment of the present disclosure. In particular, the graph 300 illustrates the process of detection, acquisition, and tracking of a target. Specifically, a search and cueing sensor 310 (which has a large field of view (FOV), a coarse pointing error, and a relatively long response time) is first used to detect the target. Once the target is detected, the search and cueing sensor 310 hands off the acquisition and tracking of the target to a LADAR system 320 (which has a narrow FOV, a fine pointing error, and a relatively rapid response time). The characteristics of the LADAR system 320 are achieved by the cascading FOVs provided by the IRST passive sensor and the LADAR active sensor.

The LADAR system 320 acquires the target by using a IR acquisition sensor (IR ACQ) 330, which is a narrow FOV IR sensor with a pointing accuracy in the milli-radians and a response time of 10 to over 100 Hertz (Hz). Then, the LADAR system 320 tracks the target by using a fine track system (FTS) sensor (IR FTS) 340 that has a pointing accuracy in the micro-radians and a response time from 10 to over 1000 Hz. This tracking guides the LADAR tracking sensor 350, which requires a pointing accuracy within small micro-radians and a response time from 100 to over 1000 Hz. These pointing accuracies and bandwidths are achieved by using a combination of a gimbal to direct the signal (i.e. beam director) 360 and a fast steering mirror (FSM) 370.

FIGS. 4A and 4B show the cascading field of views (FOVs) for a conventional stand alone infra-red search and track (IRST) system. In particular, these figures illustrate an implementation of how the scanning IR sensing system scans (i.e. by a bar scan) its assigned surveillance volume. Scan 410 shows the scan bar 415 (e.g., a 4-bar scan) going across the azimuth to be swept by the IRST system with a change in elevation in subsequent bars to cover the elevation. As such, scan 410 shows a 4-bar scan 415. Scan 420*b* shows a close-up view of a portion 420*a* of this scanning IR surveillance 4-bar scan 415.

Depending on the number of detector elements and their inherent instantaneous fields of view (IFOVs), the IRST system can produce a tight angular reporting. This angular report "box" will handed off to the LADAR FTS for setting up its check to determine if the cue is a target or false alarm in that area. For this example, the scan 430 represents a large FOV, which is handed over from the Wide Area Search (WAS) cueing sensor to the IR FTS acquisition sensor on the LAIR. The LAIR acquisition sensor "captures" the target/FA (false alarm) cue inside the scan 440 representing a coarse FOV.

FIGS. 5A and 5B show the cascading FOVs for the disclosed system 100 for a Laser detection and ranging (LADAR) augmented infra-red (LAIR) sensor of FIG. 1C, in accordance with at least one embodiment of the present disclosure. Specifically, these figures illustrate the Wide Area Search (WAS) sensor cue to LAIR sensor hand-off. Scan 510 illustrates a coarse FOV typical of a WAS sensor, and scan 520*a* illustrates a refined, smaller FOV obtained by the IR FTS. Scan 520*b* expands scan 520*a* to show how the LAIR IR FTS sensor zooms in from a refined, smaller FOV (i.e. scan 520*b*) to a fine track sub-frame FOV (i.e. scan 530), and hands off the tracking to a Laser transmitter with a several orders of magnitude smaller FOV (i.e. scan 540). When the Laser energy hits the target, it produces high-resolution information from the Laser receive sensor on the LAIR.

FIG. 6 is a graph 600 showing the acquisition, tracking, and pointing timeline for the disclosed system 100 for a Laser detection and ranging (LADAR) augmented infra-red (LAIR) sensor of FIG. 1C, in accordance with at least one embodiment of the present disclosure. The horizontal axis of the graph 600 shows the rate that the function on the vertical axis is performed. This timeline indicates the cascading FOV target search process is very rapid.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for detecting and tracking a target, the method comprising:
    positioning, with a two-dimensional (2D) gimbal, a 2D infra-red (IR) fine track sensor until it receives an IR signal from the target,
    wherein the IR fine track sensor, a Laser transmitter, and a Laser receiver are mounted together on the gimbal;
    receiving, with the infra-red (IR) IR fine track sensor, the IR signal from the target;
    determining, with at least one processor, an estimate of a direction of the target using the IR signal;
    transmitting, with the Laser transmitter, a Laser signal towards the direction of the target; and
    receiving, with the Laser receiver, the Laser signal after it reflects off of the target.

2. The method of claim 1, wherein the method further comprises determining, with the at least one processor, at least one of an azimuth, elevation, and range of the target using the IR signal and the Laser signal.

3. The method of claim 1, wherein the method further comprises determining, with the at least one processor, at least one of an azimuth rate, elevation rate, and range rate of the target using the IR signal and the Laser signal.

4. The method of claim 1, wherein the method further comprises determining, with the at least one processor, a brightness of the target using a photon arrival rate of the Laser signal and a range of the target.

5. The method of claim 1, wherein the method further comprises tracking, by using an inertial navigation system and the gimbal, the target using the IR signal.

6. The method of claim 1, wherein the method further comprises stabilizing, with a fast steering mirror (FSM), the Laser signal onto the Laser receiver.

7. The method of claim 1, wherein the method further comprises stabilizing, with a fast steering mirror (FSM), the IR signal onto the IR fine track sensor.

8. The method of claim 1, wherein the Laser receiver is a photon receiver.

9. The system of claim 1, wherein the system further comprises an inertial navigation system, wherein the inertial navigation system and the gimbal are used to track the target using the IR signal.

10. The method of claim 1, wherein the method further comprises reflecting, off of a primary mirror and a secondary mirror, the Laser signal.

11. The method of claim 1, wherein the method further comprises reflecting, off of a primary mirror and a secondary mirror, the IR signal.

12. A system for detecting and tracking a target, the system comprising:
  a two-dimensional (2D) gimbal to position a 2D infra-red (IR) fine track sensor until it receives an IR signal from the target,
  wherein the IR fine track sensor, a Laser transmitter, and a Laser receiver are mounted together on the gimbal;
  the infra-red (IR) IR fine track sensor to receive the IR signal from the target;
  at least one processor to determine an estimate of a direction of the target using the IR signal;
  the Laser transmitter to transmit a Laser signal towards the direction of the target; and
  the Laser receiver to receive the Laser signal after it reflects off of the target.

13. The system of claim 12, wherein the at least one processor is further to determine at least one of an azimuth, elevation, and range of the target using the IR signal and the Laser signal.

14. The system of claim 12, wherein the at least one processor is further to determine at least one of an azimuth rate, elevation rate, and range rate of the target using the IR signal and the Laser signal.

15. The system of claim 12, wherein the at least one processor is further to determine a brightness of the target using a photon arrival rate of the Laser signal and a range of the target.

16. The system of claim 12, wherein the system further comprises a fast steering mirror (FSM) to stabilize the Laser signal onto the Laser receiver.

17. The system of claim 12, wherein the system further comprises a fast steering mirror (FSM) to stabilize the IR signal onto the IR fine track sensor.

18. The system of claim 12, wherein the Laser receiver is a photon receiver.

19. The system of claim 12, wherein the system further comprises a primary mirror and a secondary mirror to reflect the Laser signal.

20. The system of claim 12, wherein the system further comprises a primary mirror and a secondary mirror to reflect the IR signal.

* * * * *